United States Patent
Yu et al.

(10) Patent No.: US 7,121,692 B2
(45) Date of Patent: Oct. 17, 2006

(54) BACKLIGHT MODULE

(75) Inventors: Chuan-Pei Yu, I-Lan Hsien (TW); Kelly Wei, Hsin-Chu (TW)

(73) Assignee: AU Optronics Corp., Hsin-Chu City (TW)

( * ) Notice: Subject to any disclaimer, the term of this patent is extended or adjusted under 35 U.S.C. 154(b) by 0 days.

(21) Appl. No.: 10/605,653

(22) Filed: Oct. 15, 2003

(65) Prior Publication Data
US 2005/0002205 A1   Jan. 6, 2005

(30) Foreign Application Priority Data
Jul. 2, 2003   (TW) ................ 92118127 A

(51) Int. Cl.
*F21V 5/00*   (2006.01)
(52) U.S. Cl. .............. 362/330; 362/29; 362/97; 362/555; 362/561; 349/64
(58) Field of Classification Search .......... 362/27, 362/31, 330–332, 555, 29–30, 97, 561; 349/61–69
See application file for complete search history.

(56) References Cited

U.S. PATENT DOCUMENTS

| | | | | |
|---|---|---|---|---|
| 4,843,381 A * | 6/1989 | Baron | ............... | 345/88 |
| 5,070,431 A * | 12/1991 | Kitazawa et al. | ............... | 362/31 |
| 5,477,422 A * | 12/1995 | Hooker et al. | ............... | 362/29 |
| 6,007,209 A * | 12/1999 | Pelka | ............... | 362/30 |
| 6,008,871 A * | 12/1999 | Okumura | ............... | 349/61 |
| 6,065,845 A * | 5/2000 | Miyazaki | ............... | 362/26 |
| 6,134,092 A * | 10/2000 | Pelka et al. | ............... | 361/31 |
| 6,419,372 B1 * | 7/2002 | Shaw et al. | ............... | 362/231 |
| 6,523,966 B1 * | 2/2003 | Satoh et al. | ............... | 362/601 |
| 6,561,663 B1 * | 5/2003 | Adachi et al. | ............... | 362/616 |
| 6,601,962 B1 * | 8/2003 | Ehara et al. | ............... | 362/31 |
| 6,666,569 B1 * | 12/2003 | Obata | ............... | 362/339 |
| 6,697,042 B1 * | 2/2004 | Cohen et al. | ............... | 345/102 |
| 6,789,921 B1 * | 9/2004 | Deloy et al. | ............... | 362/252 |
| 6,805,468 B1 * | 10/2004 | Itoh et al. | ............... | 362/362 |
| 2004/0105247 A1 * | 6/2004 | Calvin et al. | ............... | 362/31 |

FOREIGN PATENT DOCUMENTS

| | | | |
|---|---|---|---|
| JP | 0694920 A | * | 4/1994 |
| JP | 09-304623 | | 11/1997 |
| JP | HI0-082915 A | | 3/1998 |
| JP | 2000-030520 A | | 1/2000 |
| JP | 2002-258281 | | 9/2002 |
| JP | 2002-298629 | | 10/2002 |
| JP | 2003-59325 | | 2/2003 |
| JP | 2003-84140 | | 3/2003 |
| JP | 2003-123525 | | 4/2003 |
| TW | 566781 | | 12/2003 |

* cited by examiner

*Primary Examiner*—Thomas M. Sember
*Assistant Examiner*—Jason Moon Han
(74) *Attorney, Agent, or Firm*—Winston Hsu

(57) ABSTRACT

A backlight module includes a plurality of point light source generators, a diffusing plate installed on the plurality of point light source generators for scattering the light generated by the plurality of point light source generators, and a diffusing sheet installed above the diffusing plate for diffusing the light emitted from the diffusing plate.

9 Claims, 5 Drawing Sheets

BACKLIGHT MODULE

BACKGROUND OF INVENTION

1. Field of the Invention

The present invention relates to a backlight module, and more specifically, to a backlight module using a plurality of point light source generators as light sources.

2. Description of the Prior Art

Backlight modules are one of the most important parts of liquid crystal displays (LCD), which are widely used in digital cameras, personal digital assistants (PDAs), computer monitors, and flat panel televisions. Generally, a backlight module is installed under a display panel and provides a uniform light to the display panel utilizing a light source and a diffusing plate, and controls pixel electrodes on the display panel to display images. Backlight modules can be divided into a direct type with a light source means under a display panel, and an edge light type with a light source on the edge of the display panel.

Please refer to FIG. 1 showing the structure of a conventional direct type backlight module 10. As shown in FIG. 1, the backlight module 10 is installed under a display panel 12 and includes at least one light source generator 14, a diffusing sheet 16 installed between the light source generator 14 and the display panel 12, a diffusing plate 18 installed between the light source generator 14 and the diffusing sheet 16, and a reflecting plate 20 fixed on a housing 22 under the light source generator 14.

The light source generator 14 is for providing a light source to the display panel 12, the reflecting plate 20 is for reflecting the light generated by the light source generator 14 upward to increase efficiency of the light source generator and provide a brighter output. The diffusing plate 18 is for scattering the light generated by the light source generator 14 to the diffusing sheet 16, and the diffusing sheet 16 can further scatter the light passing through it to provide uniform light to the display panel 12. The housing 22 installed under the reflecting plate 20 and covering the reflecting plate 20 is for fixing the diffusing plate 18, the reflecting plate 20, and the light source generator 14. Generally, at least one prism sheet 24 is installed above the diffusing sheet 16 to further modify the differences of light intensity so that the light received by the display panel 12 has a more uniform light intensity distribution. The quantity and the arrangement of the prism sheet(s) 24 can be modified according to the requirements.

The light source generator 14 in the conventional backlight module 10 is composed of at least one cold cathode fluorescent lamp (CCFL). In order to fulfill the requirements of high brightness, the light source generator 14 in the conventional backlight module 10 is installed in a narrow space. The narrow space often results in the heat generated during operation not being successfully dissipated. When the CCFL is operated for a long time, the light tubes may overheat. Additionally, when the temperature of the light tubes is over a normal range of 70° C.~80° C., not only the brightness of the backlight module and the life of the light tubes decrease but the high temperature may cause low display quality (e.g. poor contrast) of the display panel 12. Additionally, electromagnetic interference occurs when the number of CCFL light tubes exceeds a typical level, limiting the usage of LCDs (e.g. unable to use in an aircraft).

SUMMARY OF INVENTION

It is therefore a primary objective of the present invention to provide a backlight module without all the disadvantages of a conventional backlight module.

Briefly summarized, a backlight module includes a plurality of point light source generators, a diffusing plate installed on the plurality of point light source generators for scattering the light generated by the plurality of point light source generators, and a diffusing sheet installed above the diffusing plate for diffusing the light emitted from the diffusing plate.

The present invention utilizes the plurality of point light source generators and uniforms the light with a plurality of scattering apertures and scattering patterns on the diffusing plate, not only providing a reliable light source, but also resolving the problems of the prior art using CCFLs as light sources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
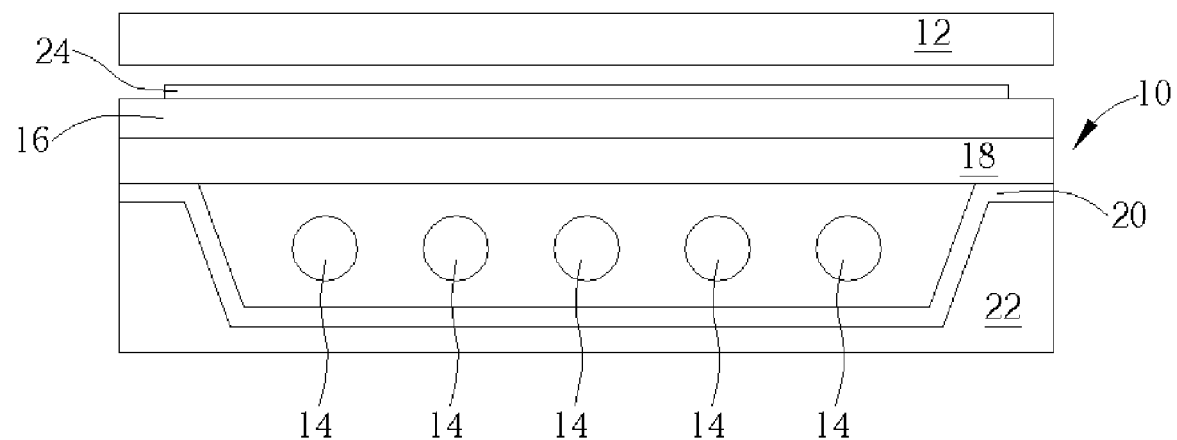
FIG. 1 illustrates the structure of a conventional direct type backlight module.
Figure 2:
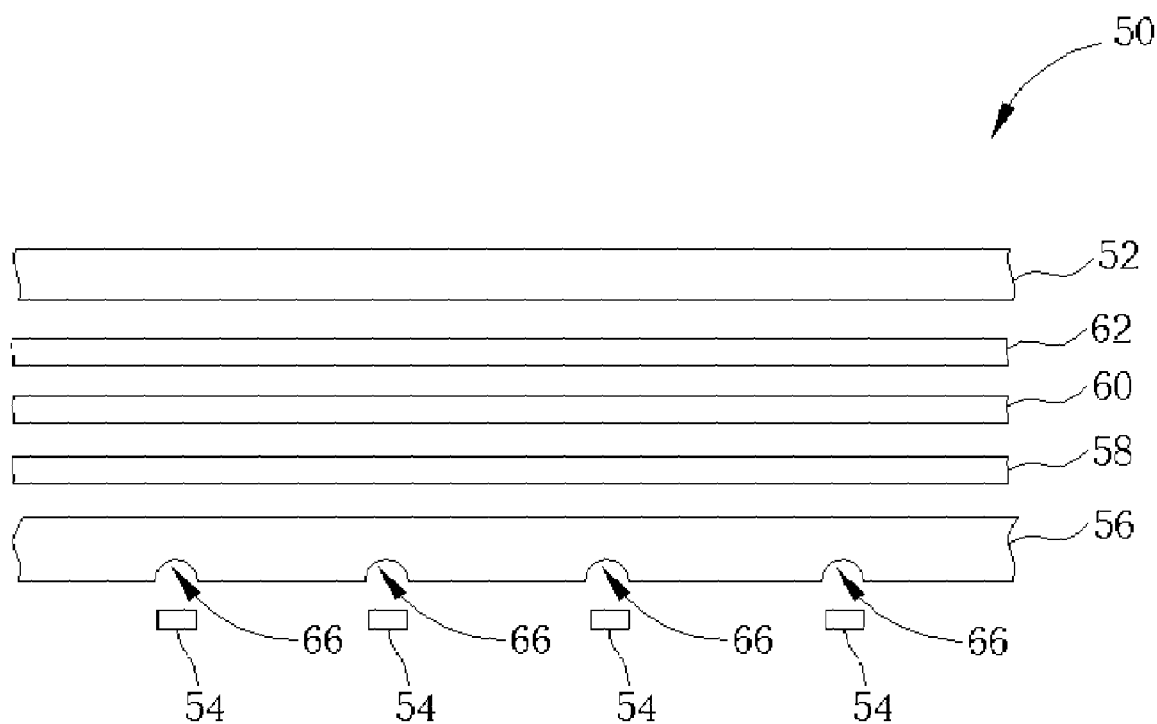
FIG. 2 illustrates the structure of a backlight module according to the present invention.

Please refer to FIG. 2 showing the structure of a backlight module 50 according to the present invention. As shown in FIG. 2, the backlight module 50 is installed under a display panel 52 and includes a plurality of point light source generators 54, a diffusing plate 56 installed on the point light source generators 54 for guiding the light generated by the point light source generators 54, a diffusing sheet 58 installed above the diffusing plate 56 for diffusing the light emitted from the diffusing plate 56, a prism sheet 60 installed above the diffusing sheet 58 for further modifying the direction of light from the diffusing sheet 58 in order to increase the luminance of the backlight module, and a brightness enhancement film (DBEF) 62 such as a 3M™ DBEF installed above the prism sheet 60 for increasing the brightness of the backlight module 50. Notice that in this embodiment, the surface of the diffusing plate 56 opposite to the point light source generators 54 further includes a plurality of arc shaped scattering apertures 66. The number and position of the scattering apertures 66 correspond to the number and position of the point light source generators 54 in order to scatter the light from the point light source generators 54 uniformly.

The point light source generators 54 may be light emitting diodes (LEDs) or other similar light emitting devices for providing a stable light source to the backlight module 50. The BEF 62 is for enhancing the brightness of the light output by the backlight module 50 and can be a BEF, a dual brightness enhancement film (DBEF), or a polarization conversion film (PCF). Furthermore, the diffusing plate 56 may include transparent scattering particles (transparent materials such as $SiO_2$ which are not shown) or white scattering particles (white materials such as $TiO_2$ which are not shown) for scattering the light entering into the diffusing plate 56 uniformly.

Moreover, the point light source generators 54 are aligned in an array on a printed circuit board (PCB, not shown), or aligned in an array under the diffusing plate 56 by means of a transparent carrier accompanied by a proper circuit arrangement. The backlight module 50 can further include a reflecting plate (not shown) installed under the point light source generators 54 for reflecting the light generated by the point light source generators 54 to increase the efficiency of light source generators 54.

Figure 3:
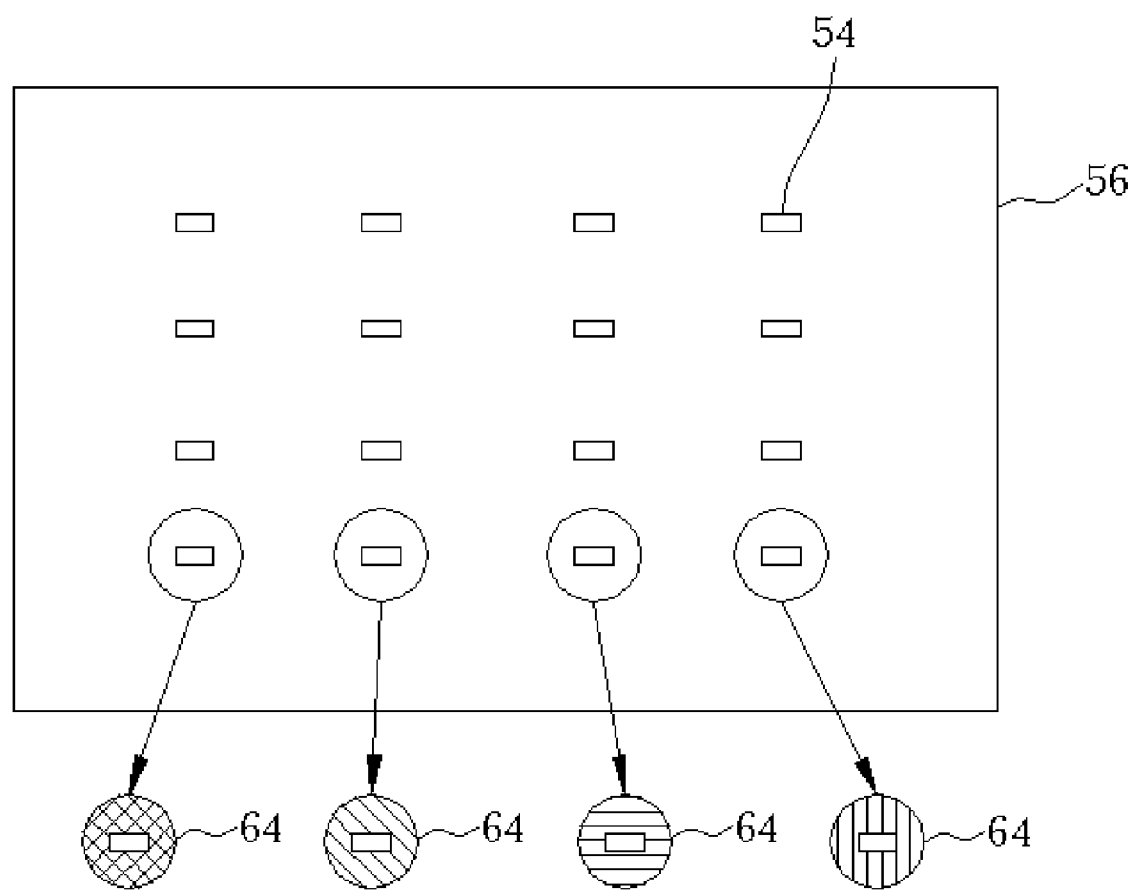
FIG. 3 illustrates a top view of the diffusing plate from the direction of the point light source generators.

Please refer to FIG. 3 showing a top view of the diffusing plate 56 from the direction of the point light source generators 54. As shown in FIG. 3, the point light source generators 54 are distributed uniformly under the diffusing plate 56. Notice that the number and arrangement of the point light source generators 54 in FIG. 3 is only one example of the present invention and not to be considered as limiting. The number and arrangement of the point light source generators 54 can be changed according to the brightness requirements of the backlight module 50 without departing from the intended spirit of the present invention. Moreover, the surface of the diffusing plate 56 includes a plurality of scattering patterns 64 (partially enlarged in FIG. 3) for scattering the light generated by the point light source generators 54. The scattering patterns 64 are composed of arc shaped trenches or V-trenches on the surface of the diffusing plate 56, and can be horizontally lined, vertically lined, obliquely lined or cross-lined for a better scattering performance.

Figure 4:
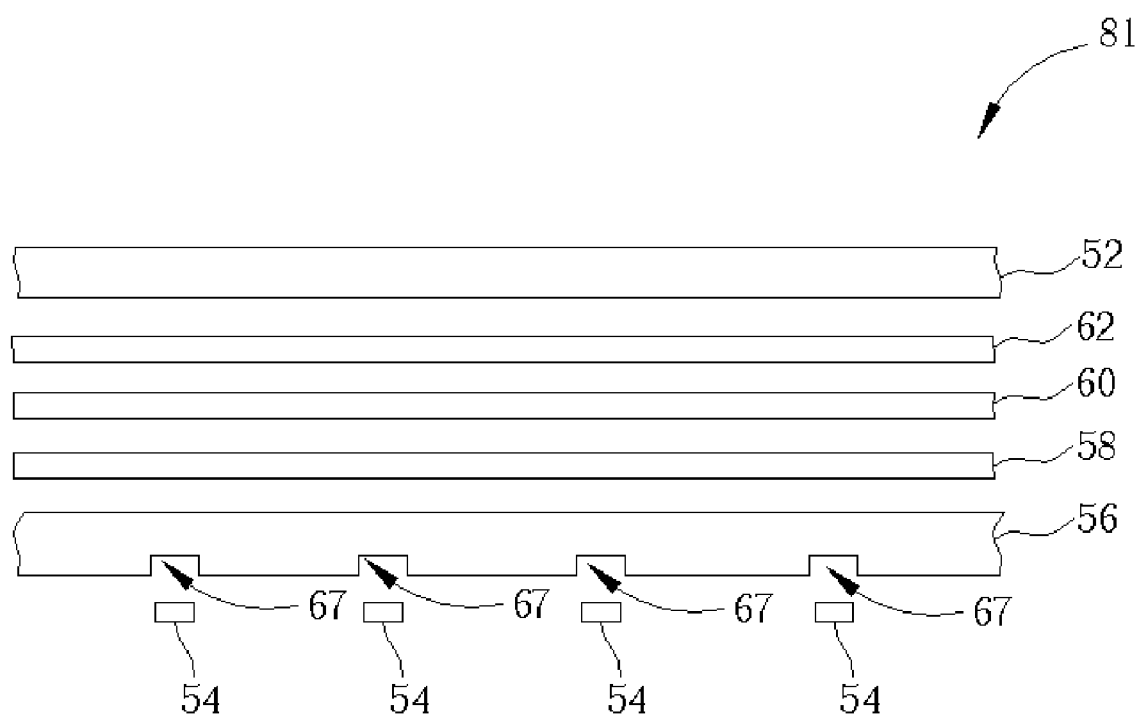
FIG. 4 illustrates the structure of another backlight module according the present invention.
Figure 5:
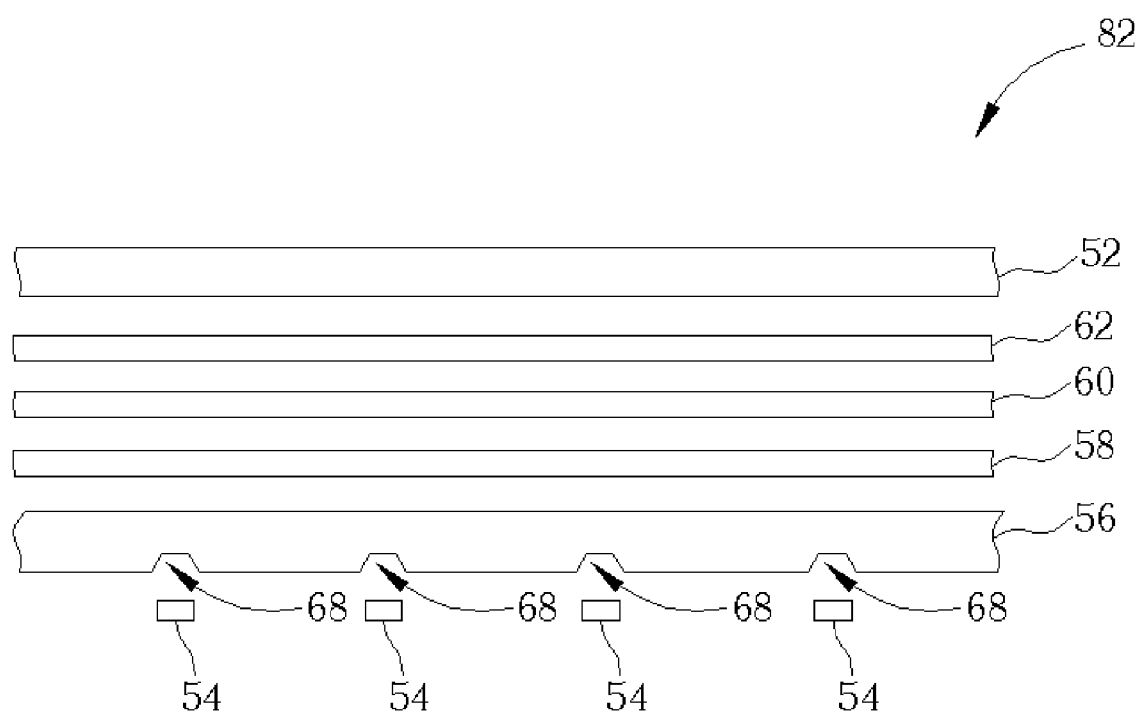
FIG. 5 illustrates the structure of another backlight module according to the present invention.

Please refer to FIG. 4 and FIG. 5 showing respectively the structures of the backlight modules 81 and 82 according to the second and the third embodiment of the present invention. The difference from the first embodiment is that the shape of scattering apertures 67 and 68 on the surface of the diffusing plate 56 is rectangular (as shown in FIG. 4) and trapezoidal (as shown in FIG. 5) respectively. The scattering apertures 66, 67, and 68 are for scattering the light generated by the point light source generators 54 uniformly, and can be designed differently according to the scattering performance and is not limited to the shapes mentioned above. Moreover, the inner walls of the scattering apertures 66, 67, and 68 can further include the scattering patterns (not shown) mentioned above to increase the performance on scattering.

The point light source generators 54 (e.g. LED) are directive with a smaller diffusion angle, thus the scattering patterns 64, the scattering apertures 66, 67, and 68, and the scattering particles on the diffusing plate 56 can effectively scatter the light generated by the point light source generators 54 to provide a uniform and stable light source to a LCD.

In contrast to the prior art, the backlight module uses a plurality of LED point light source generators as a light source, and scatter the light uniformly by scattering patterns and scattering apertures on a diffusing plate, while avoiding problems such as poor heat dissipation and electromagnetic interference according to the prior art using CCFL, lengthening the life of an LCD. Moreover, LED have a larger range of operating temperature than CCFL and are mercury-free, thus the problems of overheating and low brightness in the prior art can be resolved.

What is claimed is:

1. A direct type backlight module comprising:
  a plurality of point light source generators;
  a diffusing plate installed atop the plurality of point light source generators for scattering the light generated by the plurality of point light source generators, the diffusing plate further comprising a plurality of scattering particles formed inside the diffusing plate to uniform the light generated by the point light source generators;
  a plurality of scattering apertures installed on the surface of the diffusing plate facing the plurality of point light source generators, wherein a plurality of scattering patterns are disposed over the inner wall of at least two scattering apertures, and the scattering patterns are different patterns; and
  a diffusing sheet installed above the diffusing plate for diffusing the light emitted from the diffusing plate.

2. A backlight module comprising:
  a plurality of point light source generators, the point light source generators being light emitting diodes (LEDs);
  a diffusing plate installed atop the plurality of point light source generators for scattering the light generated by the plurality of point light source generators, the diffusing plate further comprising a plurality of scattering particles formed inside the diffusing plate to uniform the light generated by the point light source generators;
  a plurality of scattering apertures installed on the surface of the diffusing plate opposite to the plurality of point light source generators, wherein a plurality of scattering patterns are disposed over the inner wall of at least two scattering aperture, and the scattering patterns are different patterns, and
  a diffusing sheet installed above the diffusing plate for diffusing the light emitted from the diffusing plate;
  wherein the number of the scattering apertures correspond to the number of the point light source generators, and the position of each scattering aperture corresponds to the position or each point light source generator.

3. The backlight module of claim 1 wherein the plurality of scattering patterns comprises a plurality of V-trenches or a plurality of arc trenches.

4. The backlight module of claim 1 further comprising at least one prism sheet installed above the diffusing sheet for uniforming the light diffused by the diffusing sheet.

5. The backlight module of claim 1 further comprising at least one brightness enhancement film installed above the diffusing plate for enhancing the brightness of the backlight module.

6. The backlight module of claim 1 further comprising a reflecting plate installed under the plurality of point light source generators for reflecting the light generated by the plurality of point light source generators to the diffusing plate.

7. The backlight module of claim 1 wherein each of the inner walls of the scattering apertures has the scattering pattern.

8. The backlight module of claim 7 wherein the scattering patterns disposed over the inner walls are the same pattern.

9. The backlight module of claim 7 wherein the scattering patterns disposed over the inner walls are different patterns.

* * * * *